US012578788B2

(12) United States Patent
Yeo

(10) Patent No.: US 12,578,788 B2
(45) Date of Patent: Mar. 17, 2026

(54) PERSISTENT HUMAN-MACHINE INTERFACES VIA GAZE AND EYE DIRECTION TRACKING

(71) Applicant: Georgia Tech Research Corporation, Atlanta, GA (US)

(72) Inventor: Woon-Hong Yeo, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 79 days.

(21) Appl. No.: 18/597,242

(22) Filed: Mar. 6, 2024

(65) Prior Publication Data

US 2024/0302897 A1 Sep. 12, 2024

Related U.S. Application Data

(60) Provisional application No. 63/488,650, filed on Mar. 6, 2023.

(51) Int. Cl.

| | |
|---|---|
| *G06F 3/01* | (2006.01) |
| *G06T 7/73* | (2017.01) |
| *G06V 10/14* | (2022.01) |
| *G06V 10/774* | (2022.01) |
| *G06V 10/82* | (2022.01) |

(Continued)

(52) U.S. Cl.
CPC .............. *G06F 3/013* (2013.01); *G06T 7/73* (2017.01); *G06V 10/14* (2022.01); *G06V 10/774* (2022.01); *G06V 10/82* (2022.01); *G06V 40/171* (2022.01); *G06V 40/193* (2022.01); *G06V 40/197* (2022.01); *G06T 2207/20084* (2013.01); *G06T 2207/30201* (2013.01)

(58) Field of Classification Search
CPC . G06F 3/013; G06T 7/73; G06T 2207/20084; G06T 2207/30201; G06V 10/14; G06V 10/774; G06V 10/82; G06V 40/171; G06V 40/193; G06V 40/197; G06V 40/18; G06V 40/19
See application file for complete search history.

(56) References Cited

U.S. PATENT DOCUMENTS

| | | | | |
|---|---|---|---|---|
| 10,852,817 | B1 * | 12/2020 | Ouderkirk .............. | G06V 40/18 |
| 2017/0293356 | A1 * | 10/2017 | Khaderi ................. | A61B 3/113 |
| 2021/0176383 | A1 * | 6/2021 | Kim ....................... | G06F 3/013 |

(Continued)

OTHER PUBLICATIONS

V. Kartsch, M. Guermandi, S. Benatti, F. Montagna, L. Benini, "An Energy-Efficient IoT node for HMI applications based on an ultra-low power Multicore Processor", presented at IEEE Sensors Applications Symp., IEEE, Piscataway, NJ 2019.

(Continued)

*Primary Examiner* — Andrew Sasinowski
(74) *Attorney, Agent, or Firm* — Meunier Carlin & Curfman LLC

(57) ABSTRACT

A camera-based eye-tracking system and a data classification method for persistent human-machine interfaces (HMI). An exemplary system may employ a deep learning algorithm (e.g., convolutional neural network) for classifying eye directions. In some implementations, the pupil center corneal reflection method of an eye tracker is employed for gaze tracking. The example system can use a supervisory control and data acquisition architecture that can be universally applied to any screen-based HMI task.

18 Claims, 11 Drawing Sheets

(51) Int. Cl.
*G06V 40/16* (2022.01)
*G06V 40/18* (2022.01)

(56) References Cited

U.S. PATENT DOCUMENTS

2021/0297635 A1* 9/2021 Horiuchi .................. A61B 1/05
2022/0415083 A1* 12/2022 Lee ........................... G06T 7/73

OTHER PUBLICATIONS

Bulling, Andreas, Daniel Roggen, and Gerhard Tröster. "Wearable EOG goggles: Seamless sensing and context-awareness in everyday environments." Journal of Ambient Intelligence and Smart Environments 1.2 (2009): 157-171.
Kaur, Amanpreet. "Wheelchair control for disabled patients using EMG/EOG based human machine interface: a review." Journal of medical engineering & technology 45.1 (2021): 61-74.
Mala, S., and K. Latha. "Feature selection in classification of eye movements using electrooculography for activity recognition." Computational and mathematical methods in medicine 2014.1 (2014): 713818.
Won, Phillip, et al. "Stretchable and transparent kirigami conductor of nanowire percolation network for electronic skin applications." Nano letters 19.9 (2019): 6087-6096.
Mishra, Saswat, et al. "Soft, wireless periocular wearable electronics for real-time detection of eye vergence in a virtual reality toward mobile eye therapies." Science advances 6.11 (2020): eaay1729.
Vidal, Mélodie, et al. "Wearable eye tracking for mental health monitoring." Computer Communications 35.11 (2012): 1306-1311.
C. C.Poon E. Y.Leung K. C.Lau B. H.Leung Y. L.Zheng P. W.Chiu Y.Yam InDesign User Experience and Usability: Interactive Experience Design: 4th Inte. Conf. Springer International Publishing Los Angeles CA USA Aug. 2-7, 2015 pp. 693-701.
Kim, Yun-Soung, et al. "All-in-one, wireless, stretchable hybrid electronics for smart, connected, and ambulatory physiological monitoring." Advanced Science 6.17 (2019): 1900939.
Lev, Astar, et al. "Eye tracking during a continuous performance test: Utility for assessing ADHD patients." Journal of Attention Disorders 26.2 (2022): 245-255.
Nobukawa, Sou, et al. "Identification of attention-deficit hyperactivity disorder based on the complexity and symmetricity of pupil diameter." Scientific Reports 11.1 (2021): 8439.
Kraines, Morganne A., Lucas JA Kelberer, and Tony T. Wells. "Rejection sensitivity, interpersonal rejection, and attention for emotional facial expressions." Journal of Behavior Therapy and Experimental Psychiatry 59 (2018): 31-39.
Schneider, Bertrand, et al. "Leveraging mobile eye-trackers to capture joint visual attention in co-located collaborative learning groups." International Journal of Computer-Supported Collaborative Learning 13 (2018): 241-261.
Fujii, Kenko, et al. "Gaze gesture based human robot interaction for laparoscopic surgery." Medical image analysis 44 (2018): 196-214.

S. Albawi, T. A. Mohammed, S. Al-Zawi, "Understanding of a Convolutional Neural Network", presented at Int. Conf. on 3 Engineering and Technology, 2017.
Cao, Yang, et al. "Probabilistic neural network applied to eye tracking control to alter the direction of an endoscopic manipulator." Mechanical Engineering Journal 4.4 (2017): 15-00568.
Holmqvist, Kenneth, and R. Andersson. "Eye tracking: A comprehensive guide to methods." Paradigms and measures (2017).
Al-Rahayfeh, Amer, and Miad Faezipour. "Eye tracking and head movement detection: A state-of-art survey." IEEE journal of translational engineering in health and medicine 1 (2013): 2100212-2100212.
Mendoza, E., et al. "Intelligent multi-agent architecture for a supervisor of a water treatment plant." Journal of Physics: Conference Series. vol. 2090. No. 1. IOP Publishing, 2021. 15 pages.
Oguntosin, Victoria, and Ademola Abdulkareem. "Design of a pneumatic soft actuator controlled via eye tracking and detection." Heliyon 6.7 (2020): 04388.
Gangar, Kavit, Hardik Ruparel, and Shreyas Lele. "Hindi to English: Transformer-based neural machine translation." International Conference on Communication, Computing and Electronics Systems: Proceedings of ICCCES 2020. Springer Singapore, 2021.
Lin, Chin-Teng, et al. "Design of a wearable eye-movement detection system based on electrooculography signals and its experimental validation." Biosensors 11.9 (2021): 343.
Lee, Joong Hoon, et al. "3D printed, customizable, and multifunctional smart electronic eyeglasses for wearable healthcare systems and human-machine interfaces." ACS applied materials & interfaces 12.19 (2020): 21424-21432.
López, Alberto, et al. "Development of an EOG-based system to control a serious game." Measurement 127 (2018): 481-488.
Chen, Chao, et al. "Quadcopter robot control based on hybrid brain-computer interface system." Sensors and Materials 32.3 (2020): 991-1004.
Ameri, Shideh Kabiri, et al. "Imperceptible electrooculography graphene sensor system for human-robot interface." npj 2D Materials and Applications 2.1 (2018): 19.
Choudhari, Ajit M., et al. "An electrooculography based human machine interface for wheelchair control." Biocybernetics and Biomedical Engineering 39.3 (2019): 673-685.
L. Wei, H. Hu, K. Yuan, "Use of Forehead Bio-signals for Controlling an Intelligent Wheelchair", presented at IEEE Inter. Conf. on Robotics and Biomimetics, IEEE, Pisataway, NJ 2009.
Heo, Jeong, Heenam Yoon, and Kwang Suk Park. "A novel wearable forehead EOG measurement system for human computer interfaces." Sensors 17.7 (2017): 1485.
Mishra, Saswat, et al. "Soft, conformal bioelectronics for a wireless human-wheelchair interface." Biosensors and Bioelectronics 91 (2017): 796-803.
Pérez-Reynoso, Francisco David, et al. "Human-machine interface: Multiclass classification by machine learning on 1D EOG signals for the control of an omnidirectional robot." Sensors 21.17 (2021): 5882.
Shyamkumar, Prashanth, et al. "A wearable remote brain machine interface using smartphones and the mobile network." Advances in Science and Technology 85 (2013): 11-16.

* cited by examiner

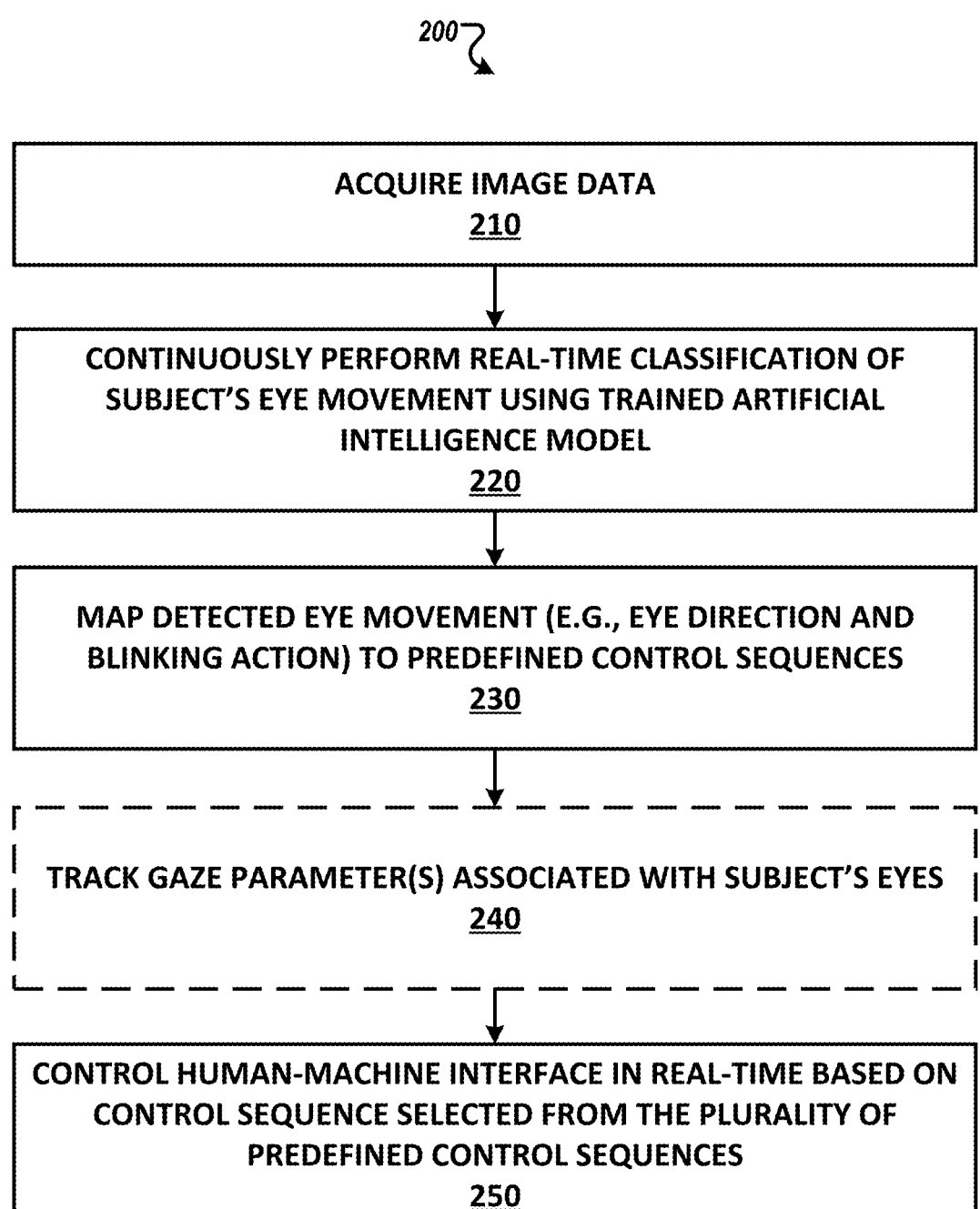

200

ACQUIRE IMAGE DATA
210

CONTINUOUSLY PERFORM REAL-TIME CLASSIFICATION OF SUBJECT'S EYE MOVEMENT USING TRAINED ARTIFICIAL INTELLIGENCE MODEL
220

MAP DETECTED EYE MOVEMENT (E.G., EYE DIRECTION AND BLINKING ACTION) TO PREDEFINED CONTROL SEQUENCES
230

TRACK GAZE PARAMETER(S) ASSOCIATED WITH SUBJECT'S EYES
240

CONTROL HUMAN-MACHINE INTERFACE IN REAL-TIME BASED ON CONTROL SEQUENCE SELECTED FROM THE PLURALITY OF PREDEFINED CONTROL SEQUENCES
250

Eyes - up          Eyes - blink

Eyes - left        Eyes - right

CNN Algorithm
(accuracy = 99.99%)

1. Face detection → 2. Eye detection → 3. Gray scaling → 5. Eye classification

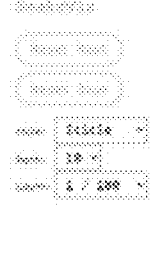
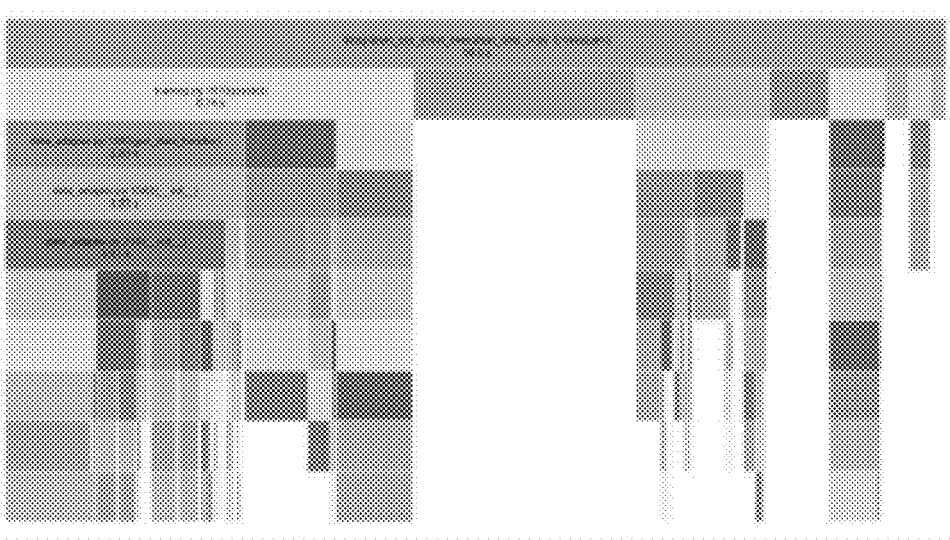
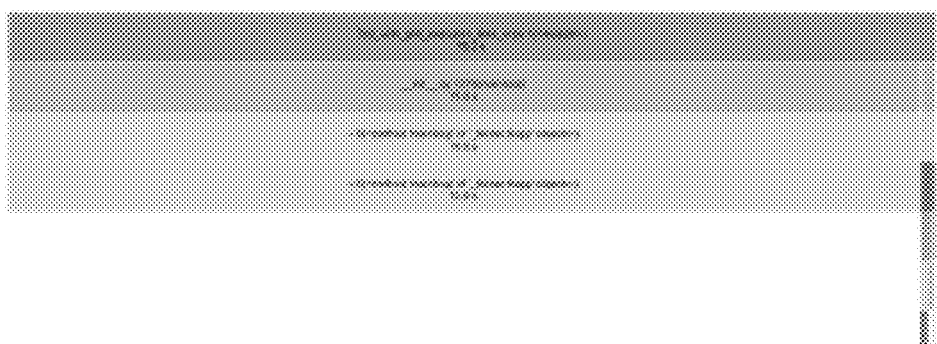
FIG. 5B

PERSISTENT HUMAN-MACHINE INTERFACES VIA GAZE AND EYE DIRECTION TRACKING

CROSS-REFERENCE TO RELATED APPLICATIONS

This application claims priority to and the benefit of U.S. Provisional Application No. 63/488,650, titled "PERSISTENT HUMAN-MACHINE INTERFACES FOR ROBOTIC ARM CONTROL VIA GAZE AND EYE DIRECTION TRACKING," filed on Mar. 6, 2023, the content of which is hereby incorporated by reference herein in its entirety.

BACKGROUND

Recent advances in sensors and electronics have enabled electrooculogram (EOG) detection systems for capturing eye movements. However, EOG signals are susceptible to the sensor's skin-contact quality while being inconvenient for the user to wear.

Commercial eye-tracking software is available that offers control functions based on eye tracking. The control functions often employ complicated eye movements for human-machine interface (HMI) applications and can cause eye fatigue. Camera systems are also influenced by environmental lighting conditions.

There is a benefit to improving existing systems and methods.

SUMMARY

Embodiments of the present disclosure introduce a camera-based eye-tracking system and a data classification method for persistent human-machine interfaces (HMI). The term "persistent" refers to the use of the exemplary device over the course of a day, or a substantial portion thereof, in continuous real-time HMI usage, using classification of gaze and eye directions. The system can employ a single camera or multiple cameras, for example, 2, 3, 4, etc.

The exemplary system may employ a deep learning algorithm for classifying eye directions and utilizing the pupil center corneal reflection method of an eye tracker for gaze tracking. The example system can use a supervisory control and data acquisition architecture that can be universally applied to any screen-based HMI task. A study was conducted that shows that the classification algorithm using deep learning enables exceptional accuracy (99.99%) with the number of actions per command (>64), the highest performance compared to other HMI systems.

A study was conducted that demonstrated real-time control of a robotic arm captures the unique advantages of the precise eye-tracking system for playing a chess game and manipulating dice. Embodiments of the HMI systems can be used in a variety of applications for remote control of surgery robots, warehouse systems, and construction tools. An example model has been implemented with controlled experimental settings comprising controllable lighting conditions, utilizing an eye tracker through camera-based image analysis.

In an aspect, a method is provided that includes acquiring a first image of a subject, including of the subject's eyes, via a first camera system (e.g., webcam); continuously performing real-time classification of a direction of the subject's eyes using a trained artificial intelligence (AI) model (e.g., convolutional neural network) configured to identify blinking action or four or more eye directions from the acquired first image, wherein each eye direction and the blinking action are mapped to a plurality of predefined control sequences for use in a human-machine interface.

In some implementations, each of the plurality of predefined control sequences defines an action based on the blinking action or one of the four or more eye directions being maintained for at least 1 second.

In some implementations, the method further includes: identifying facial landmarks from the acquired first image, wherein the continuous real-time classification of the direction of the subject's eyes additionally employs the facial landmarks in the trained AI model.

In some implementations, the method further includes: tracking a gaze parameter associated with the subject's eyes based on an eye-tracking system as a second camera system that acquired the gaze parameter concurrent with the acquisition of the first image; and controlling the human-machine interface in real-time based on (i) a control sequence selected from the plurality of predefined control sequences derived from the real-time classification and (ii) coordinates or position data for the human-machine interface defined by the gaze parameter.

In some implementations, the tracking of the gaze parameter includes: identifying a cornea region of the subject's eyes; identifying pupil regions based on pupil reflection; and calculating gaze direction from geometric angles between the identified cornea region and pupil regions.

In some implementations, the eye tracking system employs both bright pupil eye tracking and dark pupil eye tracking to determine the gaze parameter in a two-dimensional or three-dimensional space.

In some implementations, the human-machine interface is coupled to a robotic system including a surgical robot, a warehouse robot, or a construction robot.

In some implementations, the trained AI model includes a trained convolutional neural network.

In another aspect, a system is disclosed that includes a first camera system; a second camera system; and a controller having a processor and memory. The memory can have instructions stored thereon, wherein execution of the instructions by the processor causes the processor to: acquire a first image of a subject, including of a subject's eyes, via the first camera system (e.g., webcam); continuously perform real-time classification of a direction of the subject's eyes using a trained AI model (e.g., convolutional neural network) configured to identify blinking action or four or more eye directions from the acquired first image, wherein each eye direction and the blinking action are mapped to a plurality of predefined control sequences for use in a human-machine interface.

In some implementations, each of the plurality of predefined control sequences defines an action based on the blinking action or one of the four or more eye directions being maintained for at least 1 second.

In some implementations, execution of the instructions by the processor further causes the processor to: identify facial landmarks from the acquired image, wherein the continuous real-time classification of the direction of the subject's eyes additionally employs the facial landmark in the trained AI model.

In some implementations, execution of the instructions by the processor further causes the processor to: track a gaze parameter associated with the subject's eyes based on an eye-tracking system as the second camera system that acquires the gaze parameter concurrent with the acquisition of the first image; and control the human-machine interface in real-time based on (i) a control sequence selected from the plurality of predefined control sequences derived from the real-time classification and (ii) coordinates or position data for the human-machine interface defined by the gaze parameter.

In some implementations, the instructions to track the gaze parameter include: instructions to identify a cornea region of the subject's eyes; instructions to identify pupil regions based on pupil reflection; and instructions to calculate gaze direction from geometric angles between the identified cornea region and pupil regions.

In some implementations, the eye-tracking system employs both bright pupil eye tracking and dark pupil eye tracking to determine the gaze parameter in a two-dimensional or three-dimensional space.

In some implementations, the human-machine interface is coupled to a robotic system including a surgical robot, a warehouse robot, or a construction robot.

In some implementations, the trained AI model includes a trained convolutional neural network.

In some implementations, the second camera system includes: at least one light source configured to emit infrared light, wherein the at least one light source is used to facilitate tracking the subject's gaze using a pupil center corneal reflection method.

In some implementations, the at least one light source includes four or more near-infrared light sources.

In another aspect, a non-transitory computer-readable medium is disclosed that includes a memory having instructions stored thereon to cause a processor to: acquire a first image of a subject, including of the subject's eyes, via a first camera system (e.g., webcam); and continuously perform real-time classification of a direction of the subject's eyes using a trained AI model (e.g., convolutional neural network) configured to identify blinking action or four or more eye directions from the acquired first image, wherein each eye direction and the blinking action are mapped to a plurality of predefined control sequences for use in a human-machine interface, and wherein each of the plurality of predefined control sequences defines an action based on the blinking action or one of the four or more eye directions being maintained for at least 1 second.

In some implementations, execution of the instructions by the processor further causes the processor to: track a gaze parameter associated with the subject's eyes based on an eye-tracking system as a second camera system that acquired the gaze parameter concurrent with the acquisition of the first image; and controlling the human-machine interface in real-time based on (i) a control sequence selected from the plurality of predefined control sequences derived from the real-time classification and (ii) coordinates or position data for the human-machine interface defined by the gaze parameter.

Additional advantages of the disclosed systems and methods will be set forth in part in the description which follows and in part will be obvious from the description.

BRIEF DESCRIPTION OF THE FIGURES

The components in the drawings are not necessarily to scale relative to each other. Like reference, numerals designate corresponding parts throughout the several views.

FIG. 2 is a flowchart diagram of an example method in accordance with an illustrative embodiment.

FIG. 3A shows photos of a subject using the eye-tracking interface to control a robotic arm; a screen-based hands-free system (left) and a frontal photo with a webcam (right). FIG. 3B is a flowchart showing the sequence from data recording (eye movements) with two devices (webcam and eye tracker) for robotic arm control. FIG. 3C is a schematic illustration capturing possible implementation examples of the human-machine interface (HMI) system with eye tracking.

FIG. 4A is an overview showing an architecture of an example convolutional neural network (CNN) model. FIG. 4B shows facial landmarks through numbering (left) and an example of face detection (right) of a subject while classifying each eye's movement. FIG. 4C shows examples of detected eye movements showing magnified photos of captured eyes. FIG. 4D is a Confusion matrix showing an accuracy of 99.99% for four classification classes (up, down, left, and right).

FIGS. 5A-5D show a method of processing of the eye-tracking system in the study and associated measurement time. Specifically, FIG. 5A shows the overall processing order of the screen-based hands-free eye-tracking system. FIG. 5B shows eye control execution time for chess control delay time with Cprofiler (SnakeViz). FIG. 5C shows eye control execution time for Robot hand actuation delay time with Cprofiler (SnakeViz). FIG. 5D shows a Tobii eye tracker system.

FIG. 6A is a photo of visualized near-infrared light in the subject's eye. FIG. 6B is a schematic illustration of an eye's structure. FIG. 6C is an illustration of the near-infrared light direction to explain the pupil center-corneal reflection (PCCR) method. FIG. 6D shows identification of eye-tracking data and screen-based coordinate data.

FIG. 7A is an overview of a central computing interface to process the data, control hardware of the robot, and corresponding actions. FIG. 7B is a photo capturing of the user interface and robot control sequences using gaze point data and classification algorithm.

DETAILED SPECIFICATION

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entirety and to the same extent as if each reference was individually incorporated by reference. To facilitate an understanding of the principles and features of various embodiments of the present disclosure, they are explained hereinafter with reference to their implementation in illustrative embodiments.

Embodiments of the present disclosure provide systems that can be used to control persistent human-machine interfaces (HMI) by monitoring a subject's eye movements (e.g., gaze, eye direction, blinking action, combinations thereof). An example system can include multiple camera systems (e.g., webcam, eye tracker) for monitoring the subject's eye movements in real-time. In other words, a subject's eye movements can be used as an input to a persistent HMI system.

Example System

Figure 1:
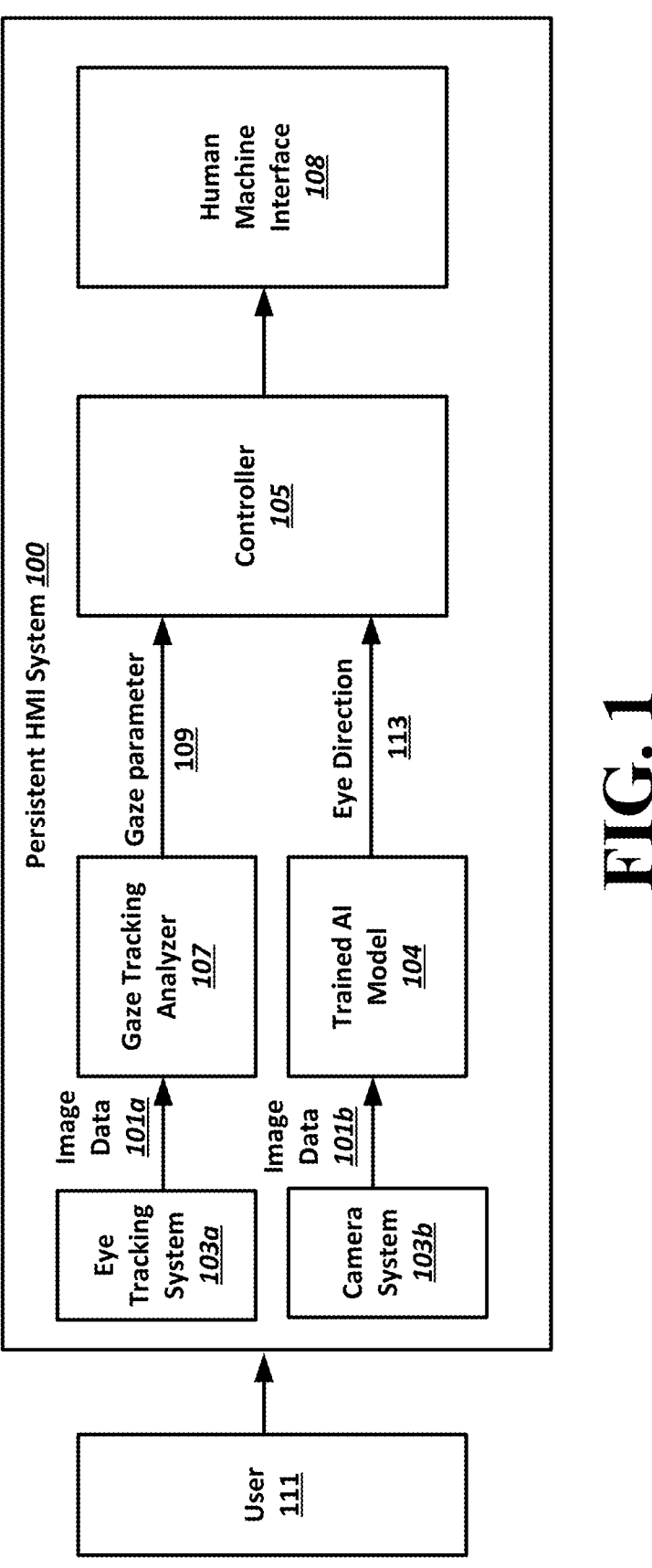
FIG. 1 is an example persistent HMI system configured for real-time control of a human-machine interface in accordance with an illustrative embodiment.

FIG. 1 shows an example persistent HMI system 100 configured for real-time control of a human-machine interface 108, for example, to control a robotic system or autonomous system. The system 100 is configured to monitor a user 111 (i.e., subject) via multiple cameras, eye tracking systems, and/or devices and continuously perform real-time classification of a user's eye movements (e.g., direction, gaze) using one or more trained artificial intelligence models or machine learning models (terms used interchangeably herein).

In the example shown in FIG. 1, the system 100 includes an eye tracking system 103a, a camera system 103b, and a controller 105. As illustrated, the system 100 acquires first image data 101a from the eye tracking system 103a and acquires second image data 101b from the camera system 103b in parallel. Alternatively, in some embodiments, image data 101 is acquired from a single camera system. The system 100 includes one or more trained machine learning models 104, such as one or more convolutional neural networks that are used to continuously perform real-time classification of the user's eye movements (e.g., direction). The system 100 further includes a gaze tracking analyzer 107 configured to determine (e.g., detect, monitor) a user's gaze to provide a gaze parameter 109.

As shown, the controller 105 tracks one or more gaze parameters associated with the user's eyes in the first image data 101a via the eye tracking system 103a. The controller 105 can additionally identify blinking action and/or a plurality of eye directions (e.g., four eye directions), shown as eye direction 113, from the second image data 101b via the trained AI model 104.

The controller 105 maps the identified blinking action and/or eye directions from the image data 101 to a plurality of predefined control sequences employed in the human-machine interface 108. That is, each eye direction or action can be encoded to a specific control action or event, for example, move, stop, take action #1, take action #2. In the context of a robotic arm, the actions can include: start arm movement, stop arm movement, grasp, release. Then, during the action of arm movement, the end or control point on the arm can be directed by the gaze parameter 109.

In some embodiments, the human-machine interface 108 can be operatively coupled to a robotic system, such as a surgical robot, warehouse robot, construction robot, gaming device, operating system interface (e.g., cursor control), and/or the like.

Example Method

FIG. 2 is a flowchart of an example method 200 for continuously performing real-time classification of a user's eye movements. In some implementations, the method 200 can be at least partially performed using the system 100 described in connection with FIG. 1. Additionally, and or alternatively, the method 200 can be at least partially performed by a processing circuitry (for example, but not limited to, an application-specific integrated circuit (ASIC), or a central processing unit (CPU)). In some examples, the processing circuitry may be electrically coupled to and/or in electronic communication with other circuitries of an example computing device. In some examples, embodiments may take the form of a computer program product on a non-transitory computer-readable storage medium storing computer-readable program instruction (e.g., computer software).

At step 210, the method 200 includes acquiring image data of a subject including of the subject's eyes. In various implementations, the image data can be acquired from one or more sources, for example, a single camera system or multiple camera systems (e.g., a webcam and an eye tracker) configured to acquire first image data and second image data from two or more camera systems.

At step 220, the method 200 includes continuously performing real-time classification of a direction of the subject's eyes using a trained artificial intelligence (AI) model (e.g., convolutional neural network) that is configured to identify, in some implementations, blinking action and/or four or more eye directions from the acquired image data. Optionally, step 220 can include identifying facial landmarks in the image data where the continuous real-time classification of the direction of the subject's eyes additionally employs the facial landmarks in the trained AI model.

At step 230, the method 200 includes mapping the detected eye direction and the blinking action to a plurality of predefined control sequences employed in a human-machine interface. In some embodiments, each of the plurality of predefined control sequences defines an action based on the blinking action or one of the four or more eye directions being maintained for at least 1 second. In other embodiments, the blinking action or four or more eye directions are maintained for other time periods (e.g., 2 seconds, ½ second, or the like)

Optionally, at step 240, the method 200 includes tracking one or more gaze parameters associated with the subject's eyes, for example, based on an eye-tracking system as a second camera system that acquires the gaze parameter concurrent with the acquisition of the first image data. In other words, a first camera system (e.g., webcam) acquires the first image data, and a second camera system (e.g., eye tracker) acquires the second image data concurrently. In some implementations, the second camera system comprises at least one light source configured to emit infrared light. The at least one light source can be used to facilitate tracking the subject's gaze using a pupil-center corneal reflection method, described in more detail herein.

At step 250, the method 200 includes controlling the human-machine interface in real-time based on (i) a control sequence selected from the plurality of predefined control sequences derived from the real-time classification and (ii) coordinates or position data for the human-machine interface defined by the gaze parameter(s). In some implementations, tracking the gaze parameter(s) includes identifying a cornea region of the subject's eyes, identifying pupil regions based on pupil reflection, and calculating gaze direction from geometric angles between the identified cornea region and pupil regions. In some embodiments, the eye tracking system employs both bright pupil eye tracking and dark pupil eye tracking to determine the gaze parameter in a two-dimensional or three-dimensional space.

Experimental Results and Additional Examples

A study was conducted to develop and evaluate a persistent human-machine interface (HMI) system to control a human-machine interface via gaze and eye direction tracking using a screen-based hands-free eye tracker. The study employed HMI in a number of robotic applications, including to control a robotic arm and a chess game.

The system of the study employed a camera eye tracking system that provided continuous real-time classification of eye movements to control robotic systems with the use of an embedded Convolutional Neural Network (CNN) model. The combination of a webcam and a commercial eye tracker based on the pupil center-corneal reflection (PCCR) method in conjunction with deep learning CNN allowed the highly accurate classification of four directions of eye movement classes (up, blink, left, and right). Notably, the example two-camera system from the study can track gaze and eye direction, which overcomes the limitations of the conventional electrooculogram (EOG) monitoring system using skin-mounting sensors. Furthermore, with only a low-cost commercial eye tracker and a webcam, the designed all-in-one interface can control the robotic arm with hands-free and high degrees-of-freedom (DOFs) that do not require other input action, such as the user's hands. The exemplary camera eye tracking system shows broad applicability, for example, it can be used for remote control of surgery systems, construction devices, and warehouse systems. The example two-camera system can employ motion detection to provide more commands with high/higher accuracies, such as turning eyes clockwise or lowering eyes from up to down.

The camera eye-tracking system of the study was configured to record eye movements for visual recognition. It included 1) the machine-learning technology, a convolutional neural network for detecting eye directions with a webcam, 2) a pupil center-corneal reflection (PCCR) method for gaze tracking with a commercial eye tracker, and 3) a single module platform including HMI/supervisory level system control and data acquisition. The camera eye tracking system can track the user's gaze and the directions of the eye at a low cost and offer precise control of HMI with simple eye movement.

The camera eye-tracking system was implemented as an all-in-one interface that can control a fully commercialized robotic arm. This all-in-one interface presents a hybrid integration of eye movement detection, eye tracking, and robotics control systems that can meet various needs, including health applications, surgery robots, and remote heavy equipment controllers. A graphical user interface (GUI) synchronically controls the robot with eye and gaze movement and completes specific tasks with the user's intentions.

Figures 3A, 3B, 3C:
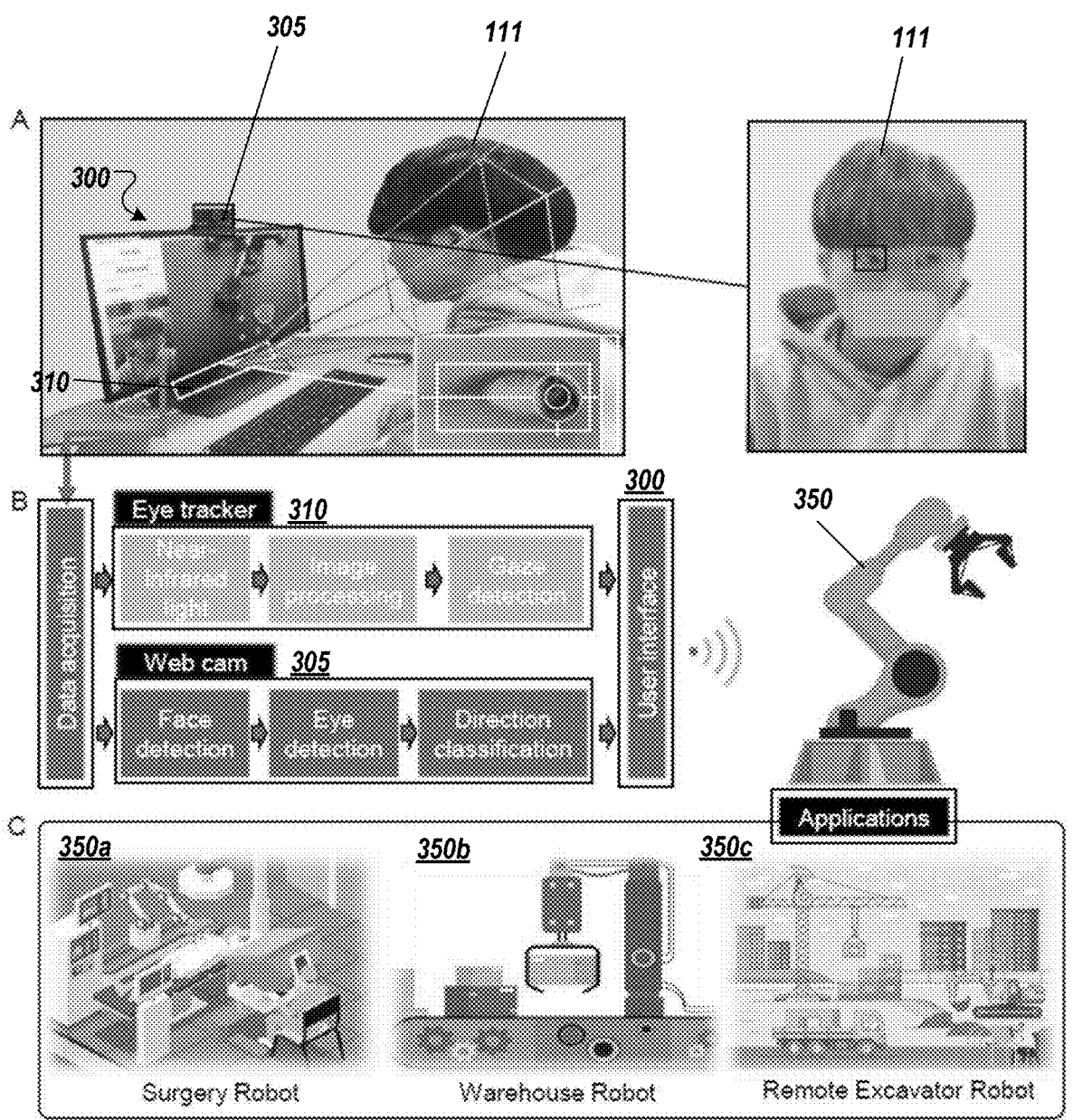
FIGS. 3A-3C show an eye tracking interface employed in a persistent human-machine interface in a study. Specifically.

FIGS. 3A-3C show an overview of a human-machine interface (HMI) system using a screen-based hands-free eye tracker employed in the study. FIG. 3A shows photos of a subject 111 using the eye-tracking interface 300 to control a robotic arm; a screen-based hands-free system (left) and a frontal photo with a webcam (right). FIG. 3B is a flowchart showing a sequence from data recording (eye movements) with two devices (eye tracker 1033a and webcam 103b) for controlling a robot 350 (i.e., robotic arm control). FIG. 3C is a schematic illustration capturing possible implementation examples of the HMI system with eye tracking (surgery robot 350a, warehouse robot 350b, and remote excavator robot 350c).

FIG. 3A shows the overview of TCES 300, composed of a webcam 305 and a commercial eye tracker 310 with an embedded convolutional neural network (CNN) model (e.g., 104) to monitor eye movements (eye directions and gaze).

CNN model 104 has been employed to detect eye directions because of its excellent performance in dealing with image data, such as computer vision [12]. Hundreds of different eye image inputs are used with this CNN model 104 to classify eye directions (up, blink, left, and right). In addition, the image data of the pupil acquired through the commercial eye tracker is conducted to track the eye's gaze and helps it act as a trigger for the all-in-one interface. The classified eye directions send commands to the robotic arm (e.g., robot 350) to perform various tasks (up: move, blink: stop, left: grip, and right: release), as shown in FIG. 3B.

Previous studies using screen-based eye trackers could control only 6-9 limited actions with eye movements [11], [13]. Additional controls often rely on other gestures, such as the user's hands or complex eye movements. TCES, with the all-in-one interface, enables control of grids through one-eye movement with two versions of actions (grip and release) per grid. More grids can be created within the operating range of the robot arm without controlling issues. FIG. 3C shows the potential applications: 1) people with disabilities who cannot move their hands can benefit from TCES, which only requires eye movements to perform tasks, such as calling a doctor/nurse or controlling the medical bed; 2) an endoscopic upper-airway surgery system for airway obstruction, recurrent hemolysis, and severe granuloma formation. Endoscopic equipment for infants (small diameter) and experienced professionals are urgently needed and dependent because of its equipment that you can remove foreign substances only with a camera. Robot-assisted endoscopic upper-airway surgery system with an exemplary system enables rapid and efficient surgery. Also, solo surgery is possible without an assistant. 3) TCES can help to work remotely on dangerous construction sites or warehouses, preventing exposure to dangers as many construction workers are often exposed to less safe work environments, such as controlling heavy equipment. The target is to automate box-moving tasks in warehouses and distribution centers. A robot arm (e.g., robot 350) with the exemplary system can work in a workplace where repetitive box lifting is required, such as unloading trucks, building pallets of boxes, and order building. Also, it makes warehouse operations more efficient and safer for workers.

Figure 4A:
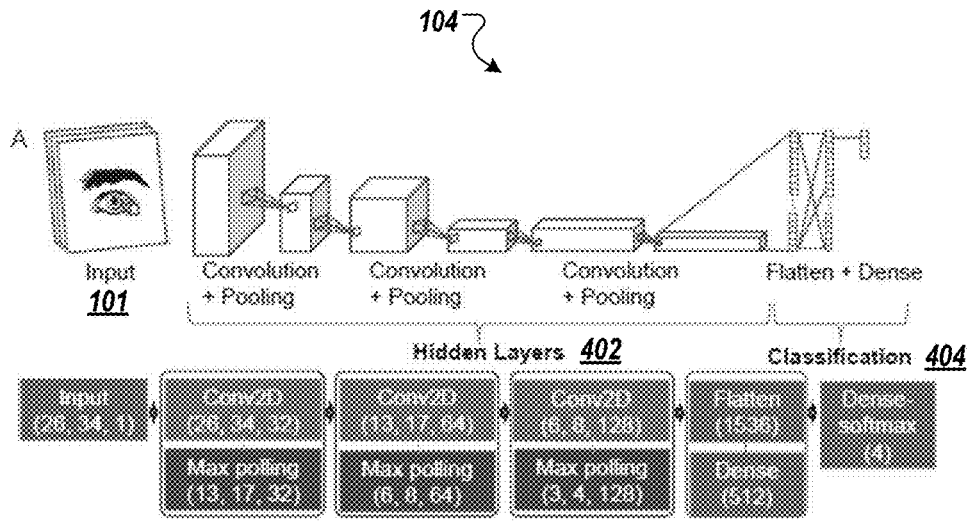
FIGS. 4A-4D show a trained AI model employed in a persistent human-machine interface in the study. Specifically.
Figure 4B:
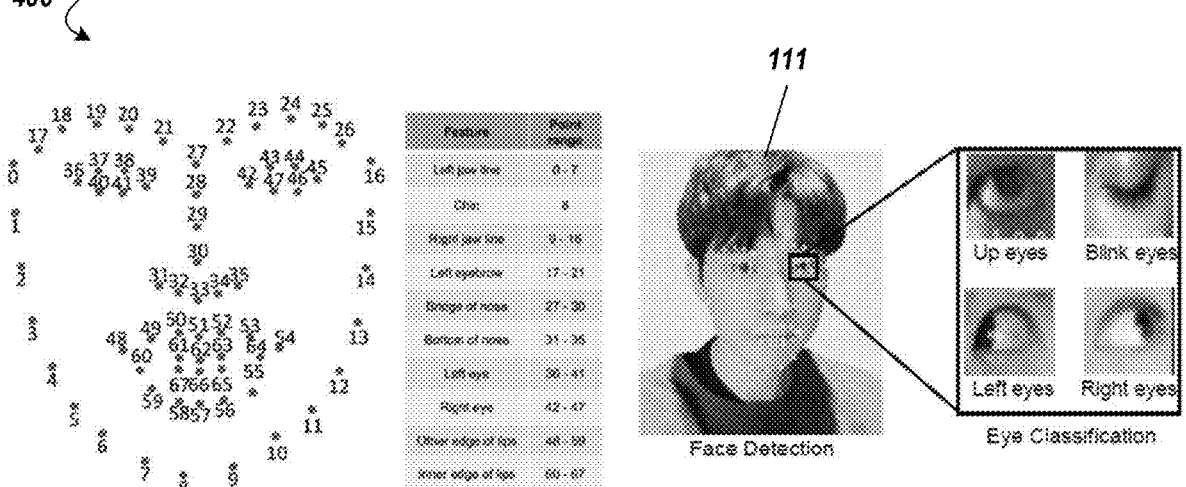
Figure 4C:
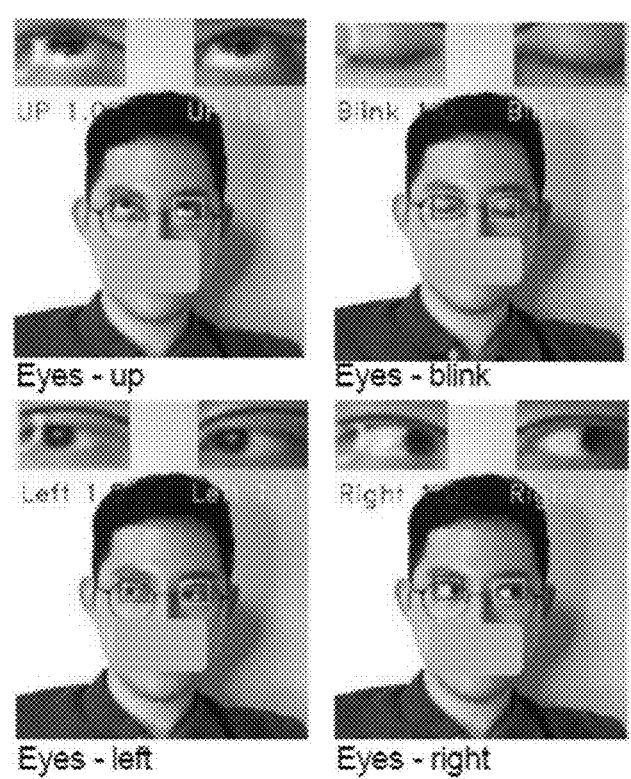
Figure 4D:
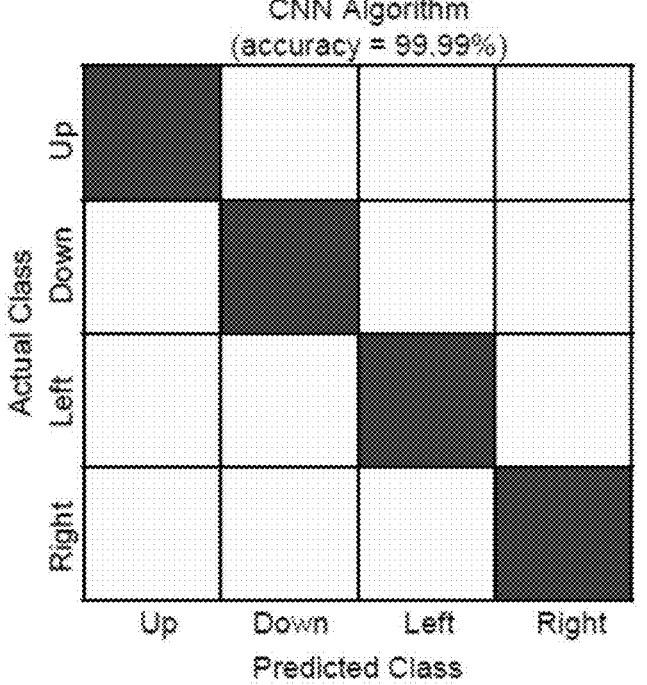

Data-Driven Classification of Images. FIGS. 4A-4D illustrate an example deep learning algorithm (convolutional neural network [CNN]) for image processing and performance results. FIG. 4A is an overview showing the architecture of an example CNN model 104 with hidden layers 402 and classification outcomes 404. FIG. 4B shows facial landmarks 406 through numbering (left) and an example of face detection (right) of a subject 111 while classifying each eye's movement. FIG. 4C shows examples of detected eye movements showing magnified photos of captured eyes. FIG. 4D is a Confusion matrix showing an accuracy of 99.99% for four classification classes (up, down, left, and right).

FIG. 4A summarizes the overview of the data-driven image classification process using our CNN model 104. The study prepared hundreds of different image inputs, which were used to develop a CNN classifier for four eye directions (up, blink, left, and right). Experimentation and model selection determined the optimal range of parameters and hyperparameters. The structure and parameters are determined based on several factors, including layers, convolution filters, stride, pooling, and activation functions. The images were split into the training set (80%) and the test set (20%). FIG. 4A further illustrates the CNN architecture and the details of the classifier development processes. First, the CNN model 104, featuring layers of 2D convolutions consists of three hidden layers. The two 2D-convolutional layers use (2,2) pool size of 2D-max pooling, ten filters, and (3,3) kernel size. After batch normalization to prevent overfitting, ten filters and (3,32), (3,64), (3,128) kernel size are used on the three single convolutional cells sequence with (2,2) pool size of 2D-max pooling. Then, the model is followed by filters of flattening from a convolutional layer to a fully connected layer. Lastly, the model uses rectified linear units and softmax for output classification. The overall real-time eye direction classification process is shown in FIG. 4B. Moreover, deep neural networks are prone to overfitting because they surround many parameters, so we applied the iImageDataGenerator function in TensorFlow to enhance accuracy and treat overfitting with our classification model. The iImageDataGenerator increases the diversity of learning data by shifting the range of rotation, width, height, and shear of the input images.

Figure 5A:
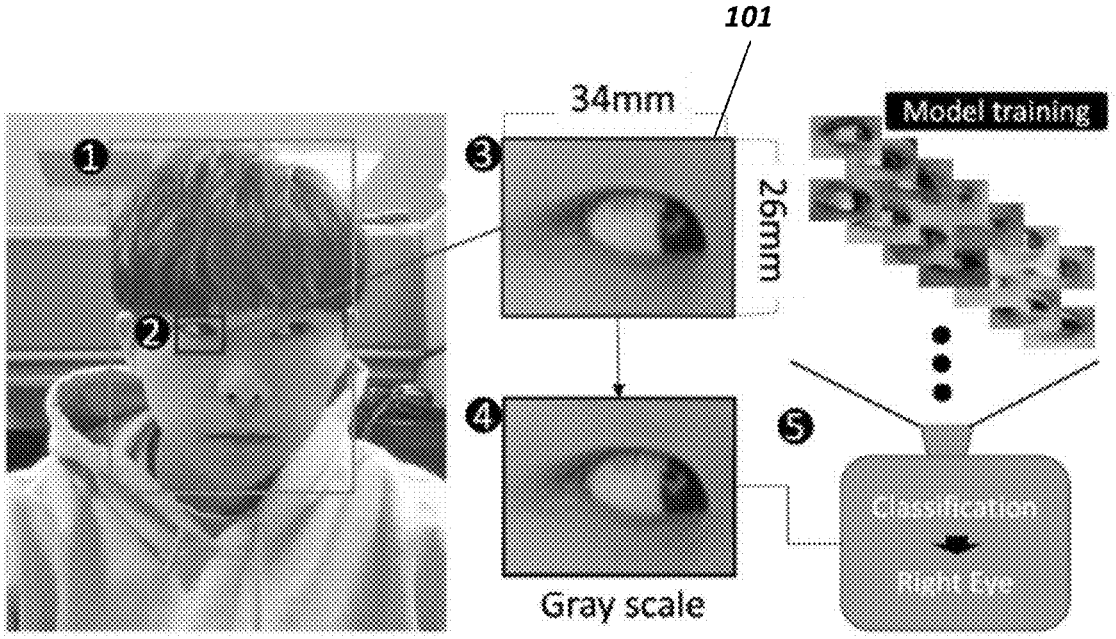

FIG. 5A shows the overall processing order of an example screen-based hands-free eye-tracking system. As shown in FIG. 5A, eye image data 101 obtained from the webcam can capture the user's eye through the face detection function (face landmark detection using CMake, Dlib, and OpenCV library). The captured eye image data 101 is scaled to 34×26 mm and then gray scale. The CNN model (e.g., CNN model 104) calculates the scaled images into four eye directions (up, blink, right, and left). For the demonstration, various eye movements are detected with classification accuracy ranging from 0 to 1 (FIG. 4C).

FIG. 4D presents the confusion matrix with an accuracy of 99.99% for four classification classes (up, down, left, and right). Table 1 below captures the advantages of TCES and superior classification performance compared to existing technologies introduced in prior studies.

Game interface results. FIG. 5B shows eye control execution time for chess control delay time with Cprofiler (Snake Viz).

Absolute eye movement time to target trigger actuation was measured with an average of 0.3 seconds over a range 0.2-0.6 seconds. The classifier time for target setting to select was measured to be, on average, 1.4 seconds over a range of 1.3-1.8 second.

The total delay time until the classifier was ready was measured, on average, to be 2.4 seconds over a range 2.3-2.8 seconds. The system trigger ready for chess movement was measured to be, on average, 3.1 seconds over a range of 2.9-3.8 seconds.

Figure 5C:
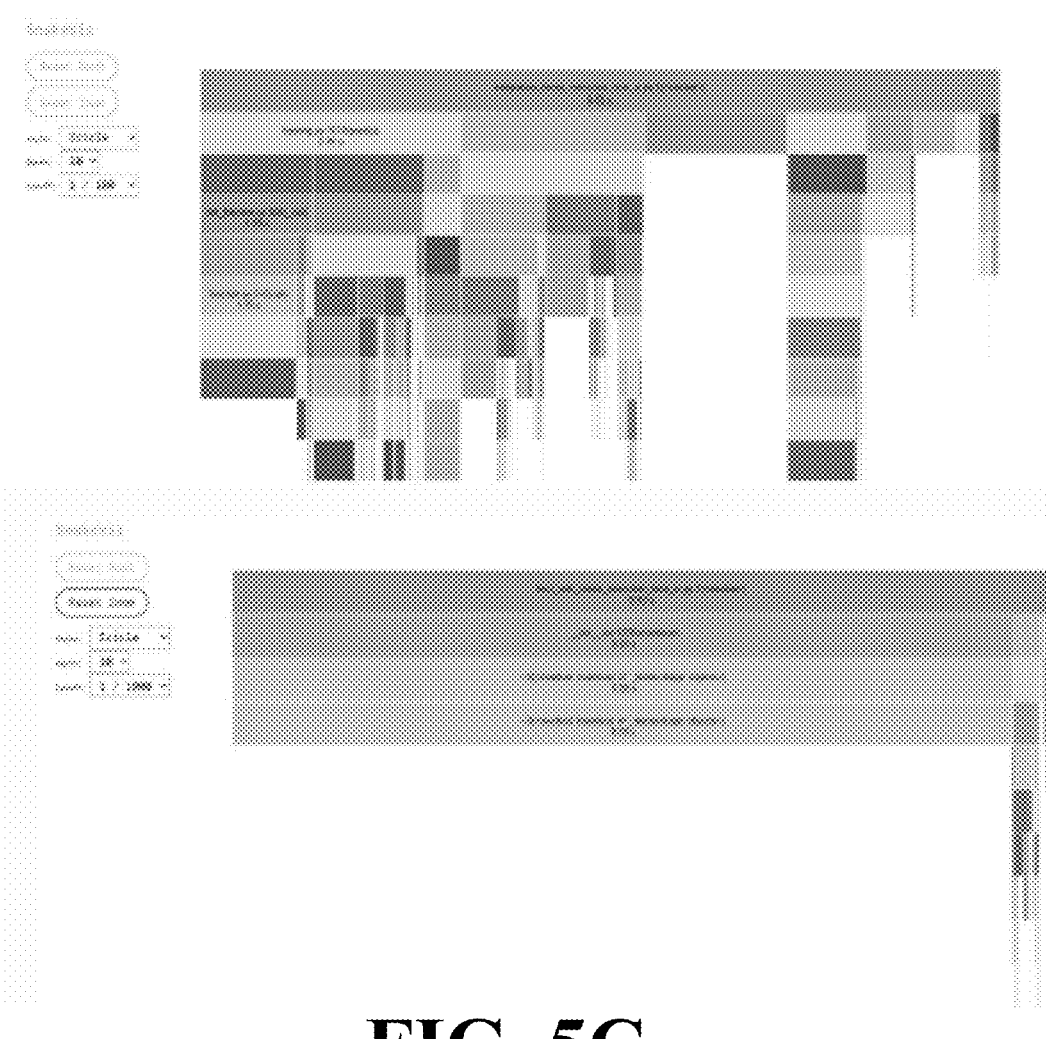

Robotic arm interface results. FIG. 5C shows eye control execution time for Robot hand actuation delay time with Cprofiler (Snake Viz). Absolute eye movement time to target trigger actuation was measured to be, on average, 0.4 seconds over a range of 0.3-0.8 seconds. The classifier time for target setting to select was measured, on average, to be 1.4 seconds over a range of 1.3-1.8 seconds. The execution to arm control SDK was measured to be, on average, 50 milliseconds (ms) over a range of 0.03-0.1 seconds. The servo controller speed was measured to be, on average, 0.5 ms-2.5 ms. The Tobii Eye tracker response time was measured to be, on average, 10 ms.

The total delay time until the CNN classifier is ready was measured, on average, to be 2.5 seconds over a range of 2.3-2.9 seconds. The system trigger ready for the robot trigger movement was measured, on average, to be 3.3 seconds over a range of 2.9-4.0 seconds.

Figure 5D:
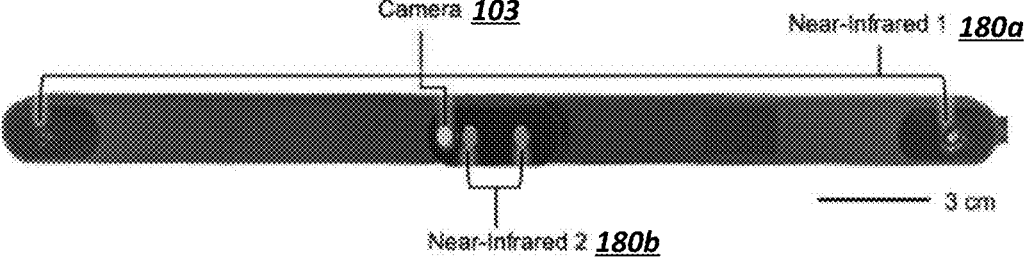

Example camera hardware. FIG. 5D shows a Tobii eye tracker system including a camera 103, a near-infrared light source 180a, and a second near-infrared light source 180b.

TABLE 1

| Year | Reference | Number of actions per command | Accuracy | Eye-tracking method | Application | Data classification algorithm |
|------|-----------|------------------|----------|-----------------|-------------|-------------------|
| 2022 | Exemplary device | ≥64 | 99.99% | Webcam + Commercial eye tracker | Robot arm controller | CNN |
| 2017 | [13] | 9 | 97.22% | Commercial eye tracker | Endoscopic manipulation | PNN |
| 2018 | [11] | 6 | 96.5% | Commercial eye tracker | Laparoscopic surgery | HMM |
| 2021 | [20] | 10 | 94.6% | EOG | Eye-dialing interface | SVM |
| 2020 | [21] | 9 | — | EOG | Game controller | DWT |
| 2018 | [22] | 5 | 97% | EOG | Game controller | SWT |
| 2020 | [23] | 6 | 96.78% | EOG | Drone controller | SVM |
| 2018 | [24] | 5 | 92% | EOG | Drone controller | Signal Processing |
| 2019 | [25] | 4 | 93.89% | EOG | Wheelchair controller | Signal Processing |
| 2018 | [26] | 5 | 98.21% | EOG | Wheelchair controller | Signal Processing |
| 2017 | [27] | 4 | 91.25% | EOG | Wheelchair controller | Signal Processing |
| 2017 | [28] | 4 | 94.1% | EOG | Wheelchair controller | LDA |
| 2021 | [29] | 4 | 98.4% | EOG | Robot controller | MLP |
| 2013 | [30] | 3 | 86.36% | EOG | Controller | Signal Processing |

Figures 6A, 6B, 6C, 6D, 6E, 6F, 6G:
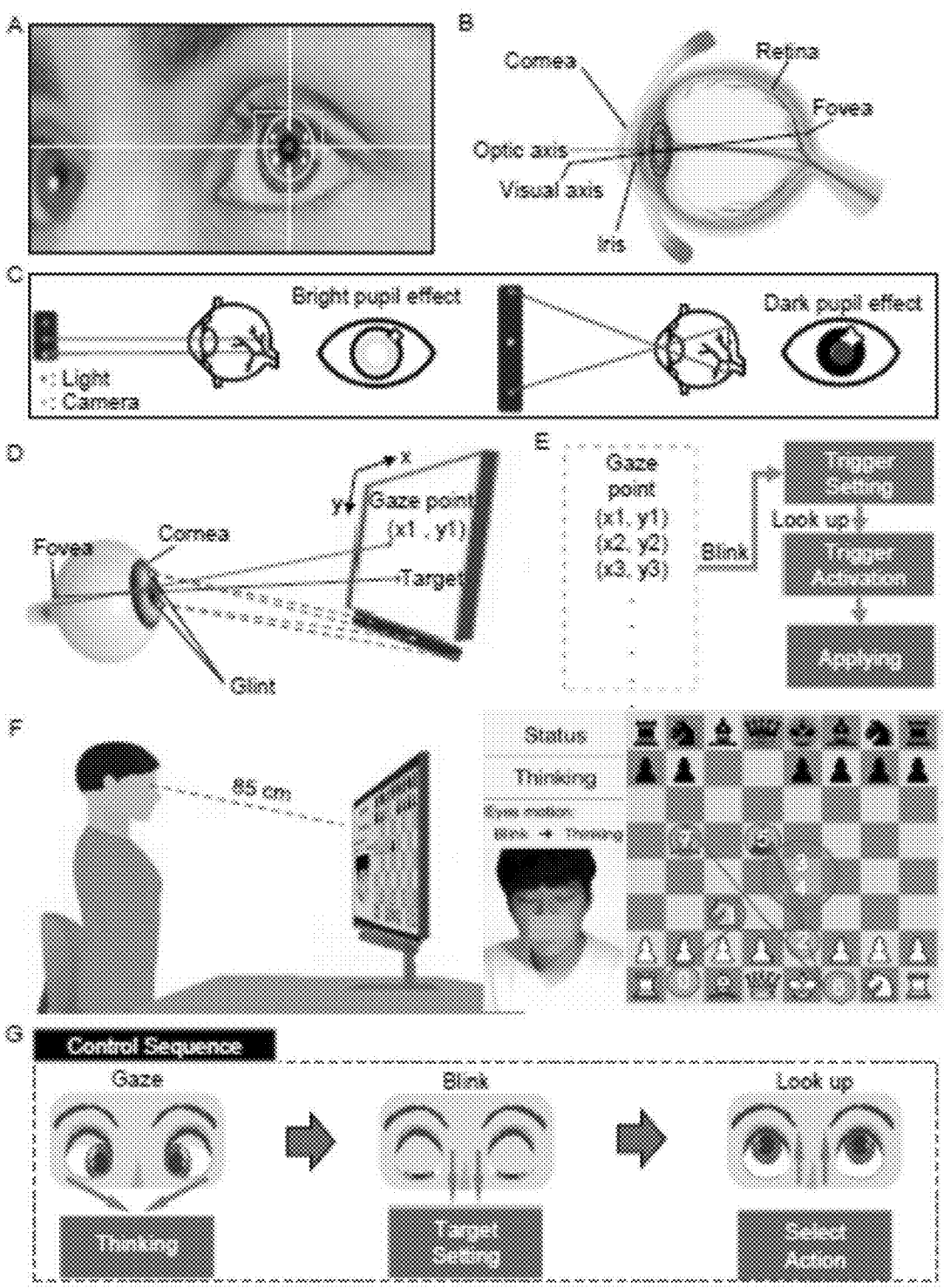
FIGS. 6A-6D show example gaze control operation via the eye tracker system in the study. Specifically.
FIG. 6E is a flow chart of a triggering interface system using gaze points.
FIG. 6F shows a chess-gaming interface detecting eye movements of a subject.
FIG. 6G shows example game control commands using gaze (thinking process), blink (target setting), and look up (selection to move the target).

FIGS. 6A-6F are schematic illustrations depicting a screen-based eye-tracker system. FIG. 6A is a photo of visualized near-infrared light in the subject's eye. FIG. 6B is a schematic illustration of an eye's structure.

FIG. 6C is an illustration of the near-infrared light direction to explain the pupil center-corneal reflection (PCCR) method.

FIG. 6D shows the identification of eye-tracking data and screen-based coordinate data.

FIG. 6E is a flow chart of a triggering interface system using gaze points. FIG. 6F shows a chess-gaming interface detecting the eye movements of a subject. FIG. 6G shows example game control commands using gaze (thinking process), blink (target setting), and look up (selection to move the target).

FIG. 6A and FIG. 6B show the eye movement analysis via infrared light. The infrared light directly enters the pupil, reflects from the iris with clear reflection, and renders the boundary of the pupil [14]. An embedded optical sensor and two cameras in the Tobii eye-tracker utilize PCCR and TTFF to generate an aggregated gaze plot to the screen. PCCR has been used as a primary eye-tracking method in this Tobii eye tracker, and processed data through TTFF has been used for better accuracy. Eye-tracking accuracy relies on analyzing the pupil's contour lines with corneal reflection. Tobii eye tracker in this study uses two PCCR illumination techniques: bright pupil eye tracking and dark pupil eye tracking, as shown in FIG. 6C. Tobii eye tracker computed both techniques for accuracy purposes and analyzes gaze comprehensively. Bright pupil eye tracking captures bright glints to identify the pupil in eye images from an optical axis of a direct light source.[15] Dark pupil eye tracking has a similar process. For pupil detection, dark glints are captured in eye images from an indirect dark light source.[15] Tobii eye tracker applied and complemented both technologies to track with high accuracy, even in unpredictable light sources. TCES can estimate the eye position accurately and convert it to Cartesian coordinate systems (FIG. 6D and FIG. 6E).

FIG. 6F shows an overview of task activation through the user's simple actions, such as "blinking" and "looking up." For the preliminary test, the study designed the interface to play chess. Playing chess is a complex task that continuously involves selections and movements of pieces. Eye movements were classified into three control sequences, as shown in FIG. 6G, to reflect the user's intentions. By the user's "blinking" motion, the gaze point data is converted to the position data and set the trigger to the interface. The study found that the interface was able to use a combination input of eye directions and gazes to move the chess pieces in the multigrid setting.

Human Machine Interface Applications. In HMI applications, many control scenarios involve complex and multi-tasking.[16] This study introduced TCES with an all-in-one interface that can control a fully commercialized robotic arm. This all-in-one interface presents a hybrid integration of eye movement detection, eye tracking, and robotics control systems that can meet various needs, including health applications, surgery robots, and remote heavy equipment controllers. A graphical user interface (GUI) synchronically controls the robot with eye and gaze movement and completes specific tasks with the user's intentions. The study introduces the all-in-one interface compatible with a remotely controlled robotic arm and a computer-based GUI.

Figures 7A, 7B, 7C:
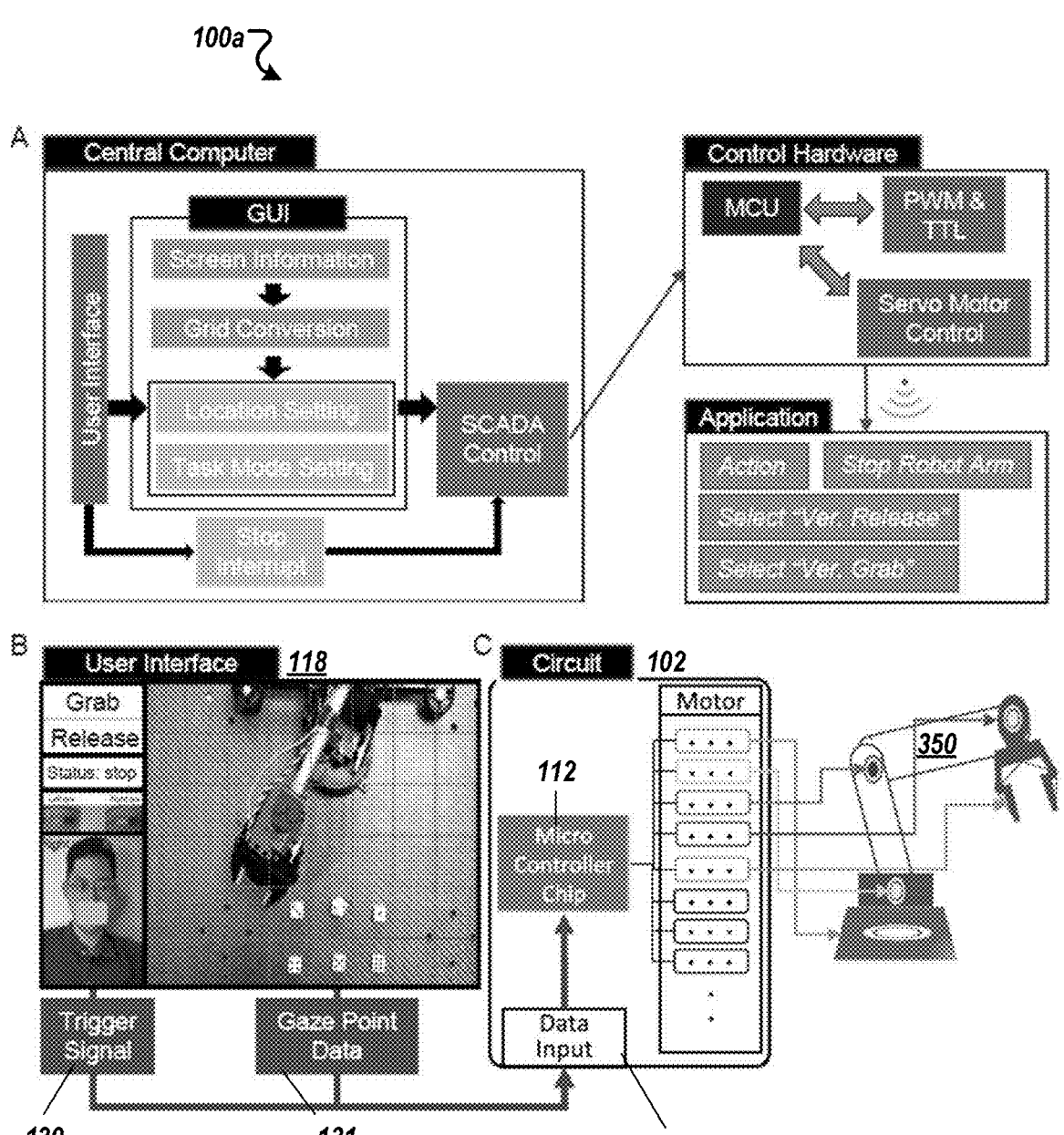
FIGS. 7A-7B show computing processes for the persistent human-machine interface for a robotic system in the study. Specifically.
FIG. 7C is an illustration showing the connection between the hardware circuit using the input data and robotic arm motors for manipulating target objects.

FIGS. 7A-7C are schematic diagrams demonstrating robotic arm control. FIG. 7A is an overview of a system 100a, including a central computing interface to process the data, control hardware of the robot (350), and corresponding actions. FIG. 7B is a photo capturing of the user interface 118 and robot control sequences using gaze point data and classification algorithm. FIG. 7C is an illustration showing the connection between the hardware circuit 102 using the input data and robotic arm motors for manipulating target objects.

An overview of the developed system is illustrated in FIG. 7A. The study demonstrated a robust interface by integrating two HMI software models (SCAD, and Machine-Level embedded systems) to the industrial control panel (LynxMotion Programmable Logic Controller [9]—PLC) robotic system. Eye movements were divided into two categories: eye direction and eye gaze [14]. The all-in-one interface classifies and tracks eye information to get the user's intention. The user's eye direction from the webcam is classified in real-time, and the result triggered the robot's movement decisions. The user's eye tracking from the commercial eye tracker indicates detected gaze in real-time. The study demonstrated 32 grids interface, as an example, that reflects the location of gaze by grids. Positional data or coordinates can be established for any size grid, e.g., 64, 128, 256, 512, 1024, 2048, 4096. The grid can be a square, rectangle, flat, or curved. The interface can also support a high-resolution grid depending on the eye-tracker resolution to satisfy the purpose and needs of the user.

FIG. 7B shows both eye gaze and results of classified eye direction displayed on the screen in real-time (user interface 118). Combining the two primary input variables commands the robot's (e.g., robot 350) motion control. FIG. 7C shows the connection between the hardware circuit using the input data and robotic arm motors for manipulating target objects. The fused data was synchronized using built-in generic hardware transistor-transistor logic signal embedded in control hardware for the robot arm control. The features enabled input into real-time visualization with only eye gaze. The system can expand behavior or trigger signals into multiple custom applications.

Figures 8A, 8B:
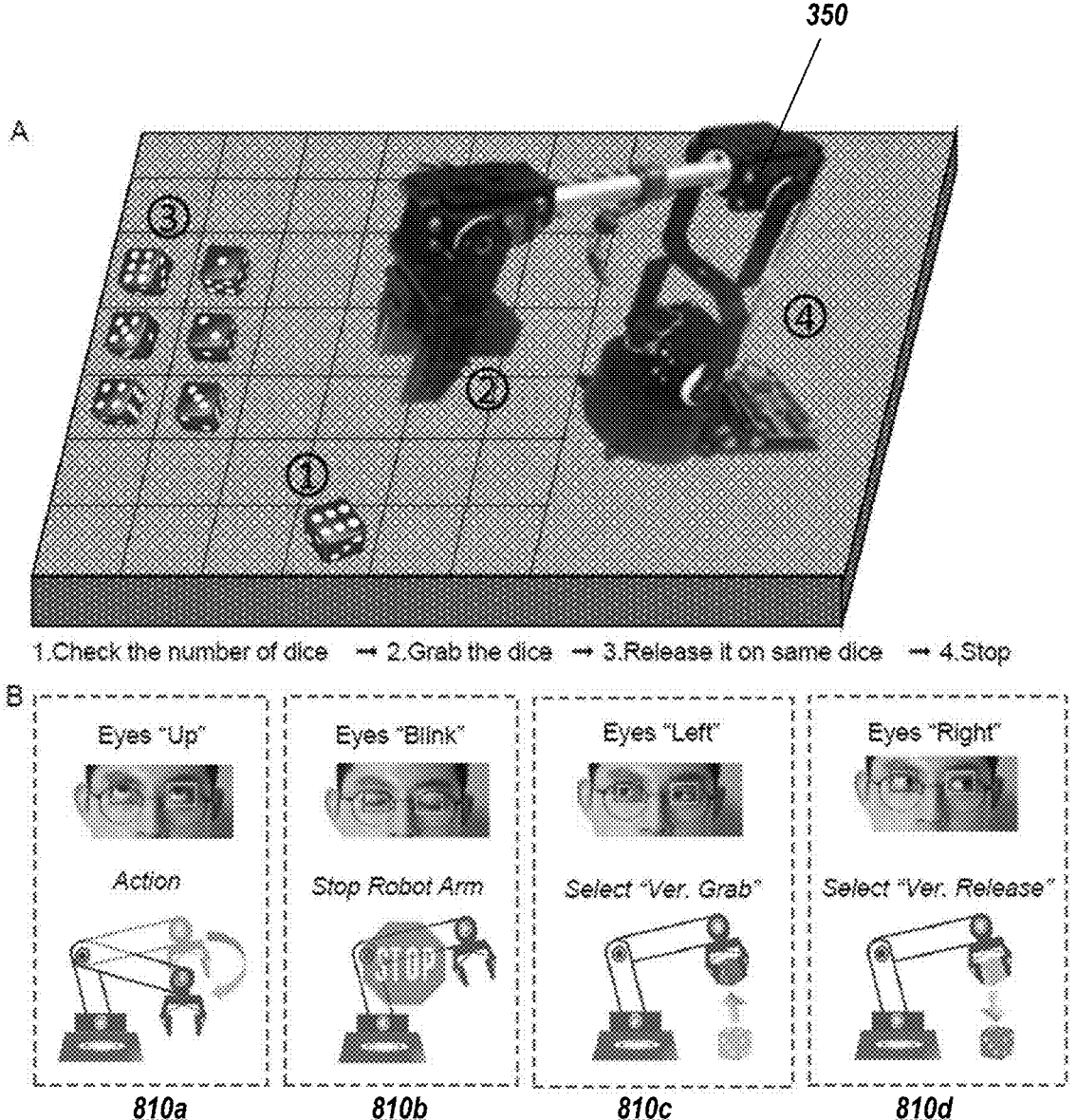
FIG. 8A and FIG. 8B depict real-time control of a robotic arm for object manipulation.

FIG. 7C shows two primary input data (as shown, trigger signal 130, gaze point data 131) streamed into a microcontroller chip (112) inside a circuit system 102. The interconnected servomotors operated the robot arm 350 with a triggered control signal from the microcontroller 112. The robot 350 operated and moved to a specific location and performs specific behavior. The Lynxmotion's PLC control panel controlled the operating system at the machine level for robot control under the central computer's command. The robot's arm 350 and grabber operation system were developed for the shortest distance to the final position. This all-in-one interface between the end devices and the robot 350 showed a remote user's ability to view and control in front of a screen. The SCADA system in this study processed the real-time image and optical data to interpret eye information (gaze and direction) from two camera-embedded end devices operating by a central computer. A custom GUI (Python and C base) was used as a master central SCADA system that triggers commercial eye-tracker software (Tobii Experience) and controls Lynxmotion PLC. The central computer processes custom GUI, back-end, network, and computation. This study shows that the TCES operates and performs as user intention-based eye movement and eye gaze. The eye-tracking system detects eye movements via cameras, which are used to control the robotic arm. A user's eye image successfully and remotely conducted complex and multiple tasks in front of a screen showing objects (dice and robotic arm). The user's eye direction and eye gaze inputs can express the user's intention and perform a sequence of tasks.[16] For simple and intuitive demonstration, the dice were randomly thrown to show the random location, as shown in FIG. 8A. The user identified the random number of the dice due to the target location through the screen. This random number of the dice implements the user's free will.

Using TCES with the all-in-one interface, the user can move the dice from a random location to the corresponding dice number location. Each eye direction triggered modes of double click (up), stop (blink), grab mode (left), and release mode (right), as shown in FIG. 5B. To distinguish different eye movements, the all-in-one interface triggered direction commands with continuous 1 s input time to classify user intention clearly. Prior literature about eye blinking shows that adult human blinks every 5 s, which takes one-third of the second. To classify the difference between "blinking" motions and the user's intentions, the TCES system captured four combination inputs of an eye "blinking" classified motions in the 1-second window to detect intentional blinks accurately. Accordingly, even if the user moves the eyes freely, the robot arm does not make a mistake. The eye direction commands in the demonstration video showed switching between modes, triggering, and stopping. The stop command worked as an immediate interrupt, representing an emergency stop in a real-world application. Absolute eye movement time to target trigger actuation had an average of 0.4 seconds (range 0.3-0.8 s). The classifier time for selecting the target setting had an average of 1.4 seconds (range 1.3-1.8 s).

Detailed delay time for the robot arm control is summarized in FIG. 5B. Through the demonstration, TCES proved the feasibility of simulating the real-world situation of medical applications, surgery robots, and remote heavy equipment controllers.

Experimental Setup. The central computer in this work ran CNN with both windows (Intel 7th Gen CPU þ Nvidia GTX 1080ti) and macOS system (MI chip, Apple). The study prepared two kinds of cameras for the experimental setup. One was a webcam combined with a CNN model that could detect the four eye directions (up, blink, left, and right), and the other was a commercial eye tracker that could track the eye gaze at a low price. The commercial eye tracker was located at the bottom of the monitor to track the user's head and pupils and must be placed within the sensor's field of view. The operating distance of a commercial eye tracker was around 85 cm. The webcam was installed on the monitor to record a frontal shot of the user's face. The TCES we designed was conducted in a sufficiently controllable experimental environment. The level of the light range was around 400 lux. Eye movement was detected on the user's face. Eye movements through an eye tracker and webcam could control the all-in-one interface we developed on the desktop. The signal from the all-in-one interface controlled the robotic arm by connecting wired or Bluetooth wireless.

Face Detection. The study used an HD 1080 P Autofocus webcam (Wansview Technology Co. Shenzhen. China) to record a person's face and used the Dlib Library to detect faces and eyes. To detect the face and establish landmarks based on the feature position, any webcam that records a person's face could be used. Dlib library included face position and facial landmarks detection. Dlib face detection used the histogram-oriented gradients (HOGs) method, and facial landmark detection followed Kazemi's model.

The face was shown with 68 other landmarks set (e.g., landmarks 406). FIG. 4B (left) shows the positions of 68 points identified on the face. Dlib included a pre-built model for face landmark detection called shape_predictor_68_facesmarks.dat. The left eye (36-41) and the right eye (42-47) were numbered, as shown in FIG. 4B (right).

Mechanical Specifications of an Eye Tracker. The Tobii Eye Tracker 5 is a commercial device that tracks eye location on a computer screen.[18] Eye tracking has been widely used to translate and analyze the visual attention of users. Practical eye tracking was based on fixation and gaze points, revealing visual attention. The basic concept was using a light source to identify both eyes that highly reflected visible illumination, captured images to identify the light source, and calculated gaze direction with geometric information such as the angle between cornea and pupil reflections. As shown in FIG. 4B, the eye tracker (Tobii) had one camera and four light sources that emitted near-infrared light.

Configuration of the Motor Servo on Robot Arm Frame. In the robot arm system for demonstration, hardware components were integrated with Lynxmotion AL5D robot arm (RobotShop Inc., Mirabel, QC, Canada), SSC-32U servo controller, and five different types of Hitec servomotors (HS-422, HS-485HB, HS-645 MG, HS-755HB, and HS-805BB). The five HS servomotors were connected to five different channels in the SSC-32U servo controller. Each channel had three inputs: a pulse width modulation pin, a voltage common collector pin, and a ground pin. Each input must be connected to each HS servomotor in order. This robot arm has five 5-DOFs.

FIG. 8A and FIG. 8B depict real-time control of a robotic arm for object manipulation including. FIG. 8A shows a control interface of dice on a floor using the robot 350, following multiple sequences: 1) determine the dice number, 2) grab the desired one, 3) move and release it on top of the same dice to stack them, and 4) go back to the initial position. B) Four eye-movement commands to control the robotic arm, including eyes up (start moving the arm), blink (stop the action), left (grab an object), and right (release an object) motions.

For simple and intuitive demonstration, the dice were randomly thrown to show the random location, as shown in FIG. 8A. The user identified the random number of the dice due to the target location through the screen. This random number of the dice implements the user's free will. Using TCES with the all-in-one interface, the user can move the dice from a random location to the corresponding dice number location. Each eye direction (810*a*, 810*b*, 810*c*, and 810*d*) triggers modes of double click (up), stop (blink), grab mode (left), and release mode (right), as shown in FIG. 8B. To distinguish different eye movements, the all-in-one interface triggered direction commands with continuous 1-second input time to classify user intention clearly. Prior literature about eye blinking shows that adult human blinks every 5 seconds, which takes one-third of the second.

Human Subject Study: The study involved healthy volunteers aged between 18 and 40 and was conducted following the approved Institutional Review Board (IRB) protocol (#H22479) at Georgia Institute of Technology. In addition, written informed consent was provided by all volunteers.

DISCUSSION

The global human-machine interface (HMI) market is expected to generate more than $8 billion in revenue from 2017 to 2023 [1]. With the development of HMI, various healthcare systems or applications for the disabled using human eyes have developed. Methods of eye movement tracking include skin-mountable sensors and camera-based image analysis.

Recent studies have shown that wheelchair control based on HMI with electrooculogram (EOG) signals via skin-mountable sensors has the potential to help people with disabilities in their daily activities [2]. Skin-mountable sensors for measuring EOG signals have developed into various patterns, such as kirigami-engineered patterns [3] and mesh patterns [4], to overcome the limitations of human skin. In addition, unlike camera-based image analysis, EOG is not affected by environmental lighting conditions. Although advances in wearable technologies have enabled portable EOG monitoring systems to detect eye movements [5], the acquired EOG signal is susceptible to ambient noise and users' small movements, limiting precise eye angle and gaze detection. Thus, the HMI with EOG shown in previous studies can only perform simple actions such as unidirectional motions in drones and wheelchairs. These limited control capabilities challenge the areas that require complex movement with a high degree of freedom (DOF) and precision, such as surgery applications (e.g., surgery robots) [6]. In addition, gel electrodes are commonly used for high-fidelity recording. However, they have poor breathability, potentially cause skin irritation, and suffer performance degradation during long-term monitoring due to drying [7]. In this regard, the recent development of machine-learning technology with a video monitoring system based on eye trackers has gained increasing attention in various fields, such as autism spectrum disorder diagnosis, [8] facial emotion diagnosis [9], and surgical robot support [10], [11]. However, most commercial eye trackers also have limitations: 1) they do not have control functions and only track gaze. 2) Even though some eye trackers have added control functions, they are expensive. 3) Commercial software offers control functions to commercial eye trackers, but the control functions require complicated eye movements for HMI applications and even cause extreme eye fatigue. 4) Camera-based image analysis is heavily influenced by environmental lighting conditions.

The exemplary system and method enables the continuous real-time classification of eye movements and control of robotic systems with the aid of an embedded CNN model. The combination of a webcam and a commercial eye tracker based on the PCCR method in conjunction with deep learning CNN allows the highly accurate classification of four directions of eye movement classes (up, blink, left, and right). The significance of TCES is that it can track gaze and eye direction, which overcomes the limitations of the conventional EOG monitoring system using skin-mounting sensors. Furthermore, with only a low-cost commercial eye tracker and a webcam, the designed all-in-one interface can control the robotic arm with hands-free and high DOFs that do not require other input action, such as the user's hands. The TCES presented in this study shows broad applicability to further developing eye-tracking systems for remote control of surgery systems, construction devices, and warehouse systems. Future work will develop a video camera system to detect eye motions and overcome the limitations of classifying eye images. The motion detector would offer more commands with high accuracies, such as turning eyes clockwise or lowering eyes from up to down.

Machine Learning Methods

Machine Learning. In addition to the trained AI model described above, the system can be implemented using one or more artificial intelligence and machine learning operations. The term "artificial intelligence" can include any technique that enables one or more computing devices or computing systems (i.e., a machine) to mimic human intelligence. Artificial intelligence (AI) includes but is not limited to knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include, but are not limited to, autoencoders and embeddings. The term "deep learning" is defined herein to be a subset of machine learning that enables a machine to automatically discover representations needed for feature detection, prediction, classification, etc., using layers of processing. Deep learning techniques include but are not limited to artificial neural networks or multilayer perceptron (MLP).

Machine learning models include supervised, semi-supervised, and unsupervised learning models. In a supervised learning model, the model learns a function that maps an input (also known as feature or features) to an output (also known as target) during training with a labeled data set (or dataset). In an unsupervised learning model, the algorithm discovers patterns among data. In a semi-supervised model, the model learns a function that maps an input (also known as a feature or features) to an output (also known as a target) during training with both labeled and unlabeled data.

Neural Networks. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers such as input layer, an output layer, and optionally one or more hidden layers with different activation functions. An ANN having hidden layers can be referred to as a deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tanh, or rectified linear unit (ReLU) function), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., an error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include but are not limited to backpropagation. It should be understood that an artificial neural network is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike traditional neural networks, each layer in a CNN has a plurality of nodes arranged in three dimensions (width, height, and depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by down sampling). A fully-connected layer includes neurons, where each neuron is connected to all of the neurons in the previous layer. The layers are stacked similarly to traditional neural networks. GCNNs are CNNs that have been adapted to work on structured datasets such as graphs.

Other Supervised Learning Models. A logistic regression (LR) classifier is a supervised classification model that uses the logistic function to predict the probability of a target, which can be used for classification. LR classifiers are trained with a data set (also referred to herein as a "dataset") to maximize or minimize an objective function, for example, a measure of the LR classifier's performance (e.g., an error such as L1 or L2 loss), during training. This disclosure contemplates that any algorithm that finds the minimum of the cost function can be used. LR classifiers are known in the art and are therefore not described in further detail herein.

A Naïve Bayes' (NB) classifier is a supervised classification model that is based on Bayes' Theorem, which assumes independence among features (i.e., the presence of one feature in a class is unrelated to the presence of any other features). NB classifiers are trained with a data set by computing the conditional probability distribution of each feature given a label and applying Bayes' Theorem to compute the conditional probability distribution of a label given an observation. NB classifiers are known in the art and are therefore not described in further detail herein.

A k-NN classifier is an unsupervised classification model that classifies new data points based on similarity measures (e.g., distance functions). The k-NN classifiers are trained with a data set (also referred to herein as a "dataset") to maximize or minimize a measure of the k-NN classifier's performance during training. This disclosure contemplates any algorithm that finds the maximum or minimum. The k-NN classifiers are known in the art and are therefore not described in further detail herein.

A majority voting ensemble is a meta-classifier that combines a plurality of machine learning classifiers for classification via majority voting. In other words, the majority voting ensemble's final prediction (e.g., class label) is the one predicted most frequently by the member classification models. The majority voting ensembles are known in the art and are therefore not described in further detail herein.

Example Computing Device

The computing device can be a computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device typically includes at least one processing unit and system memory. Depending on the exact configuration and type of computing device, system memory may be volatile (such as random access memory (RAM)), non-volatile (such as read-only memory (ROM), flash memory, etc.), or some combination of the two. The processing unit may be a processor that performs arithmetic and logic operations necessary for the operation of the computing device. The computing device may also include a bus or other communication mechanism for communicating information among various components of the computing device.

Computing device may have additional features/functionality. For example, computing device may include additional storage such as removable storage and non-removable storage, including, but not limited to, magnetic or optical disks or tapes. Computing device may also contain network connection(s) that allow the device to communicate with other devices. Computing device may also have input device(s) such as a keyboard, mouse, touch screen, etc. Output device(s), such as a display, speakers, printer, etc., may also be included. The additional devices may be connected to the bus in order to facilitate the communication of data among the components of the computing device. All these devices are well-known in the art and need not be discussed at length here.

The processing unit may be configured to execute program code encoded in tangible, computer-readable media. Tangible, computer-readable media refers to any media that is capable of providing data that causes the computing device (i.e., a machine) to operate in a particular fashion. Various computer-readable media may be utilized to provide instructions to the processing unit for execution. Example of tangible, computer-readable media may include, but is not limited to, volatile media, non-volatile media, removable media, and non-removable media implemented in any method or technology for storage of information such as computer-readable instructions, data structures, program modules or other data. System memory, removable storage, and non-removable storage are all examples of tangible, computer storage media. Examples of tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit may execute program code stored in the system memory. For example, the bus may carry data to the system memory, from which the processing unit receives and executes instructions. The data received by the system memory may optionally be stored on the removable storage or the non-removable storage before or after execution by the processing unit.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and it may be combined with hardware implementations.

CONCLUSION

Various sizes and dimensions provided herein are merely examples. Other dimensions may be employed.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications, and publications, as listed below and throughout this document, describes various application and systems that could be used in combination the exemplary system and are hereby incorporated by reference in their entirety herein.

[1] V. Kartsch, M. Guermandi, S. Benatti, F. Montagna, L. Benini, presented at IEEE Sensors Applications Symp., IEEE, Piscataway, N J 2019.

[2] a) A. Bulling, D. Roggen, G. Tröster, J. Ambient Intell. Smart Environ. 2009, 1, 157; b) A. Kaur, J. Med. Eng. Technol. 2021, 45, 61; c) S. Mala, K. Latha, Comput. Math. Methods Med. 2014, 2014, 713818.

[3] P. Won, J. J. Park, T. Lee, I. Ha, S. Han, M. Choi, J. Lee, S. Hong, K.-J. Cho, S. H. Ko, Nano Lett. 2019, 19, 6087.

[4] S. Mishra, Y.-S. Kim, J. Intarasirisawat, Y.-T. Kwon, Y. Lee, M. Mahmood, H.-R. Lim, R. Herbert, K. J. Yu, C. S. Ang, Sci. Adv. 2020, 6, eaay 1729.

[5] M. Vidal, J. Turner, A. Bulling, H. Gellersen, Comput. Commun. 2012, 35, 1306.

[6] C. C. Poon, E. Y. Leung, K. C. Lau, B. H. Leung, Y. L. Zheng, P. W. Chiu, Y. Yam, presented at Int. Conf. of Design, User Experience, and Usability, 2015.

[7] Y. S. Kim, M. Mahmood, Y. Lee, N. K. Kim, S. Kwon, R. Herbert, D. Kim, H. C. Cho, W. H. Yeo, Adv. Sci. 2019, 6, 1900939.

[8] a) A. Lev, Y. Braw, T. Elbaum, M. Wagner, Y. Rassovsky, J. Atten. Disord. 2022, 26, 245; b) S. Nobukawa, A. Shirama, T. Takahashi, T. Takeda, H. Ohta, M. Kikuchi, A. Iwanami, N. Kato, S. Toda, Sci. Q9 29 Rep. 2021, 11, 1.

[9] M. A. Kraines, L. J. Kelberer, T. T. Wells, J. Behav. Ther. Exp. Psychiatry 2018, 59, 31.

[10] B. Schneider, K. Sharma, S. Cuendet, G. Zufferey, P. Dillenbourg, R. Pea, Int. J. Comput-Support. Collab. Learn. 2018, 13, 241.

[11] K. Fujii, G. Gras, A. Salerno, G. Z. Yang, Med. Image Anal. 2018, 44, 1 196.

[12] S. Albawi, T. A. Mohammed, S. Al-Zawi, presented at Int. Conf. on 3 Engineering and Technology, 2017.

[13] Y. Cao, S. Miura, Q. Liu, Y. Kobayashi, K. Kawamura, S. Sugano, 5 M. G. Fujie, Mech. Eng. J. 2017, 15

[14] H. Kenneth, A. Richard, ISBN-13, 2017, p. 978.

[15] A. Al-Rahayfeh, M. Faezipour, IEEE J. Transl. Eng. HealthMed. 2013, 1, 8 2100212.

[16] E. Mendoza, J. Andramun͂o, J. Nun͂ez, L. Córdova, J. Phys. Conf. Ser. 10 2021.

[17] I. Fatt, B. A. Weissman, in Physiology of the Eye: An Introduction to the 12 Vegetative Functions, Butterworth-Heinemann, Oxford, U K 2013.

[18] V. Oguntosin, A. Abdulkareem, Heliyon 2020, 6, 04388. 14 K. Gangar, H. Ruparel, S. Lele, presented at Int. Conf. on Communication, Computing and Electronics Systems, 2021. Q10

[20] C. T. Lin, W. L. Jiang, S. F. Chen, K. C. Huang, L. D. Liao, Biosensors 2021, 11.

[21] J. H. Lee, H. Kim, J.-Y. Hwang, J. Chung, T.-M. Jang, D. G. Seo, Y. Gao, J. Lee, H. Park, S. Lee, ACS Appl. Mater. Interfaces 2020, 12, 21424. 21

[22] A. López, M. Fernández, H. Rodríguez, F. Ferrero, O. Postolache, Measurement 2018, 127, 481.

[23] C. Chen, P. Zhou, A. N. Belkacem, L. Lu, R. Xu, X. Wang, W. Tan, Z. Qiao, P. Li, Q. Gao, Sens. Mater. 2020, 32, 991.

[24] S. K. Ameri, M. Kim, I. A. Kuang, W. K. Perera, M. Alshiekh, H. Jeong, U. Topcu, D. Akinwande, N. Lu, NPJ 2D Mater. Appl. 2018, 2, 1.

[25] A. M. Choudhari, P. Porwal, V. Jonnalagedda, F. Mériaudeau, Biocybernet. Biomed. Eng. 2019, 39, 673.

[26] L. Wei, H. Hu, K. Yuan, presented at IEEE Inter. Conf. on Robotics and Biomimetics, IEEE, Pisataway, N J 2009.

[27] J. Heo, H. Yoon, K. S. Park, Sensors 2017, 17.

[28] S. Mishra, J. J. S. Norton, Y. Lee, D. S. Lee, N. Agee, Y. Chen, Y. Chun, W. H. Yeo, Biosens. Bioelectron. 2017, 91, 796.

[29] F. D. Pérez-Reynoso, L. Rodríguez-Guerrero, J. C. Salgado-Ramírez, R. Ortega-Palacios, Sensors 2021, 21, 5882.

[30] P. Shyamkumar, S. Oh, N. Banerjee, V. K. Varadan, Adv. Sci. Technol. 2013.

What is claimed is:

1. A method comprising:

acquiring a first image of a subject, including of the subject's eyes, via a first camera system;

continuously performing real-time classification of a direction of the subject's eyes using a trained artificial intelligence (AI) model configured to identify blinking action or four or more eye directions from the acquired first image, wherein each eye direction and the blinking action are mapped to a plurality of predefined control sequences for use in a human-machine interface;

tracking a gaze parameter associated with the subject's eyes based on an eye-tracking system as a second camera system that acquired the gaze parameter concurrent with acquisition of the first image; and controlling the human-machine interface in real-time based on (i) a control sequence selected from the plurality of predefined control sequences derived from the real-time classification, and (ii) coordinates or position data for the human-machine interface defined by the gaze parameter.

2. The method of claim 1, wherein each of the plurality of predefined control sequences defines an action based on the blinking action or one of the four or more eye directions being maintained for at least 1 second.

3. The method of claim 1 further comprising:

identifying facial landmarks from the acquired first image, wherein the continuous real-time classification of the direction of the subject's eyes additionally employs the facial landmarks in the trained AI model.

4. The method of claim 1, wherein the tracking of the gaze parameter comprises:

identifying a cornea region of the subject's eyes;

identifying pupil regions based on pupil reflection; and calculating gaze direction from geometric angles between the identified cornea region and pupil regions.

5. The method of claim 1, wherein the eye tracking system employs both bright pupil eye tracking and dark pupil eye tracking to determine the gaze parameter in a two-dimensional or three-dimensional space.

6. The method of claim 1, wherein the human-machine interface is coupled to a robotic system comprising a surgical robot, a warehouse robot, or a construction robot.

7. The method of claim 1, wherein the trained AI model comprises a trained convolutional neural network.

8. A system comprising:

a first camera system;

a second camera system;

a controller having a processor and memory, the memory having instructions stored thereon, wherein execution of the instructions by the processor causes the processor to:

acquire a first image of a subject, including of a subject's eyes, via the first camera system;

continuously perform real-time classification of a direction of the subject's eyes using a trained AI model configured to identify blinking action or four or more eye directions from the acquired first image, wherein each eye direction and the blinking action are mapped to a plurality of predefined control sequences for use in a human-machine interface;

track a gaze parameter associated with the subject's eyes using the second camera system, wherein the second camera system acquires the gaze parameter concurrent with acquisition of the first image; and control the human-machine interface in real-time based on (i) a control sequence selected from the plurality of predefined control sequences derived from the real-time classification, and (ii) coordinates or position data for the human-machine interface defined by the gaze parameter.

9. The system of claim 8, wherein each of the plurality of predefined control sequences defines an action based on the blinking action or one of the four or more eye directions being maintained for at least 1 second.

10. The system of claim 8, wherein execution of the instructions by the processor further causes the processor to:

identify facial landmarks from the acquired image, wherein the continuous real-time classification of the direction of the subject's eyes additionally employs the facial landmark in the trained AI model.

11. The system of claim 8, wherein the instructions to track the gaze parameter comprise:

instructions to identify a cornea region of the subject's eyes;

instructions to identify pupil regions based on pupil reflection; and instructions to calculate gaze direction from geometric angles between the identified cornea region and pupil regions.

12. The system of claim 8, wherein the system employs both bright pupil eye tracking and dark pupil eye tracking to determine the gaze parameter in a two-dimensional or three-dimensional space.

13. The system of claim 8, wherein the human-machine interface is coupled to a robotic system comprising a surgical robot, a warehouse robot, or a construction robot.

14. The system of claim 8, wherein the trained AI model comprises a trained convolutional neural network.

15. The system of claim 8, wherein the second camera system comprises:

at least one light source configured to emit infrared light, wherein the at least one light source is used to facilitate tracking the subject's gaze using a pupil center corneal reflection method.

16. The system of claim 15, wherein the at least one light source comprises four or more near-infrared light sources.

17. A non-transitory computer-readable medium comprising a memory having instructions stored thereon to cause a processor to:

acquire a first image of a subject, including of the subject's eyes, via a first camera system; and continuously perform real-time classification of a direction of the subject's eyes using a trained AI model configured to identify blinking action or four or more eye directions from the acquired first image, wherein each eye direction and the blinking action are mapped to a plurality of predefined control sequences for use in a human-machine interface;

track a gaze parameter associated with the subject's eyes using a second camera system, wherein the second camera system acquires the gaze parameter concurrent with acquisition of the first image; and control the human-machine interface in real-time based on (i) a control sequence selected from the plurality of predefined control sequences derived from the real-time classification, and (ii) coordinates or position data for the human-machine interface defined by the gaze parameter.

18. The non-transitory computer-readable medium of claim 17, wherein each of the plurality of predefined control sequences defines an action based on the blinking action or one of the four or more eye directions being maintained for at least 1 second.

* * * * *